Oct. 28, 1958  R. J. ADAMS  2,857,859
DOUGH TWISTING MACHINE
Filed July 25, 1957  3 Sheets-Sheet 1

INVENTOR.
REVILO J. ADAMS
BY
Cook and Schermerhorn
ATTORNEYS

Oct. 28, 1958 R. J. ADAMS 2,857,859
DOUGH TWISTING MACHINE
Filed July 25, 1957 3 Sheets-Sheet 2

INVENTOR.
REVILO J. ADAMS
BY
Cook and Schermerhorn
ATTORNEYS

Oct. 28, 1958     R. J. ADAMS     2,857,859
DOUGH TWISTING MACHINE
Filed July 25, 1957     3 Sheets-Sheet 3
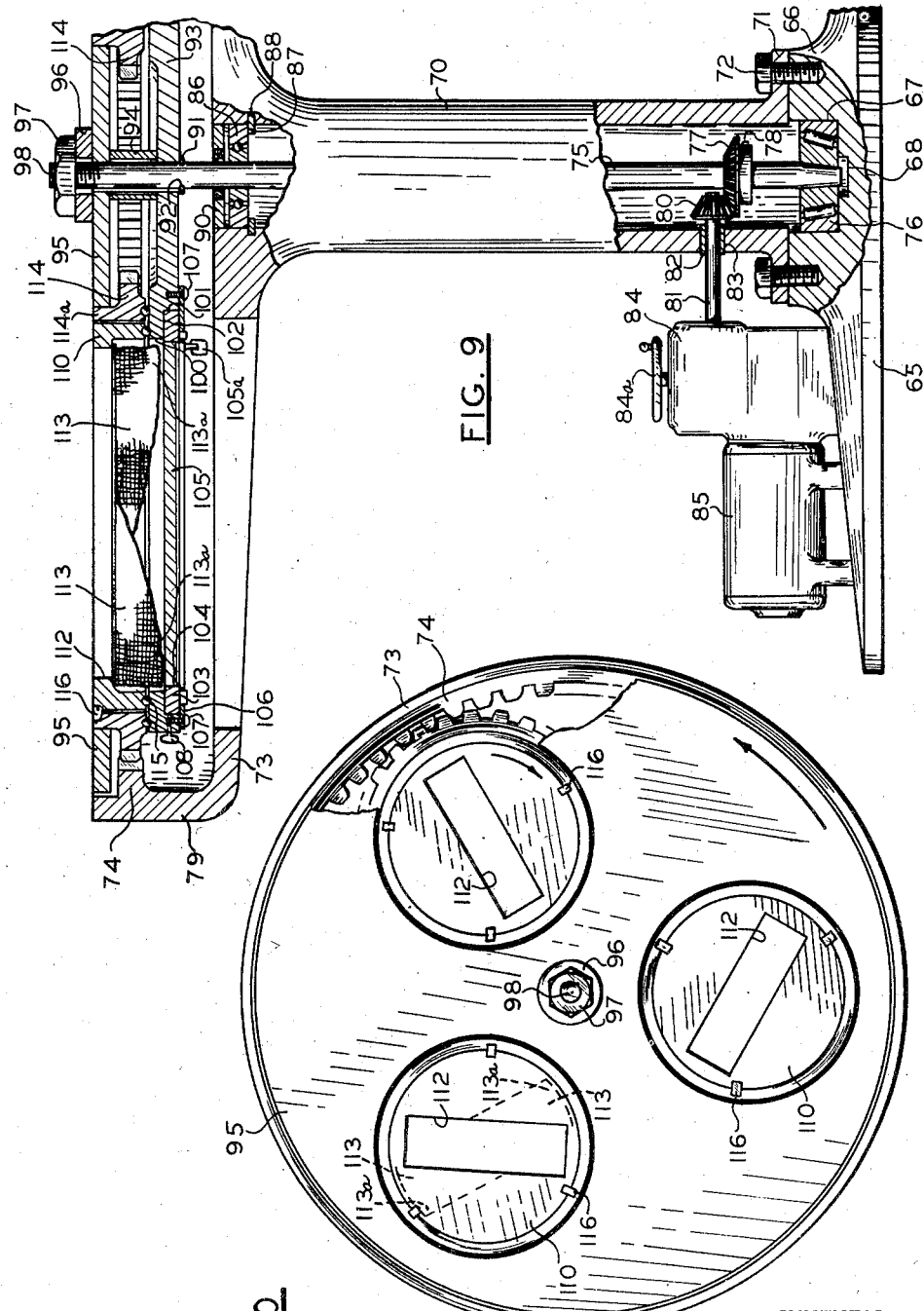
INVENTOR.
REVILO J. ADAMS
BY
Cook and Schermerhorn
ATTORNEYS

United States Patent Office 2,857,859
Patented Oct. 28, 1958

2,857,859

DOUGH TWISTING MACHINE

Revilo J. Adams, Eugene, Oreg.

Application July 25, 1957, Serial No. 674,136

11 Claims. (Cl. 107—8)

This invention relates to a dough twisting machine and, more particularly, to such a machine having provision for rolling and twisting together strips of dough so as to make bread or pastries and the like and means to vary the amount of the twist.

Generally speaking, this machine comprises two spaced-apart plates and a means to rotate one plate about its center at an angular velocity relative to the other plate. As distinct from the prior art these plates are spaced apart such a distance that the dough is not compressed or crushed between them. However, to assure twisting, means is provided on the rotating plate so that the dough is caused to both roll and twist. Due to the difference in the linear velocity of one plate relative to the other at different distances from the center of rotation, there is imparted a twisting motion and a rolling to the dough so that there results a longitudinal twist. After the proper degree of twist has been imparted to the dough it is allowed to leave the machine. Furthermore, I provide a means to vary the degree of twist.

An object of this invention is the provision of a dough twisting machine wherein the dough is not severely compressed or squeezed in the twisting operation.

A further object is the provision of a means for positively assuring the rolling and the twisting of the dough.

An additional object is the provision of means for varying the twist and the roll of the dough.

A still further and additional object is the provision of a dough twisting machine wherein it is possible to twist a multiplicity of strips of dough simultaneously.

Another object is to provide a portable machine which can be transferred from one place to another.

A further object is the provision of a machine which is relatively economical to manufacture and to use.

Further and other objects of the present invention will be apparent in the accompanying specification and claims and illustrated by the drawings which follow by way of illustrating the preferred embodiments and principle of the invention and what I now consider the best mode in which I have contemplated applying the principle.

Figure 5:
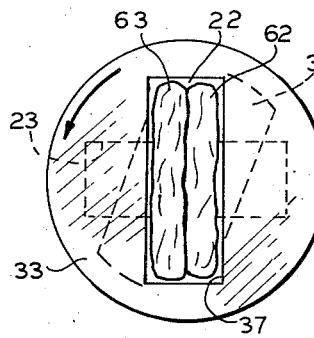
Figure 6:
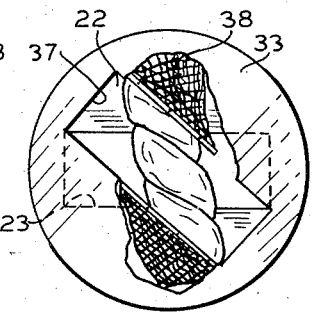
Figure 7:
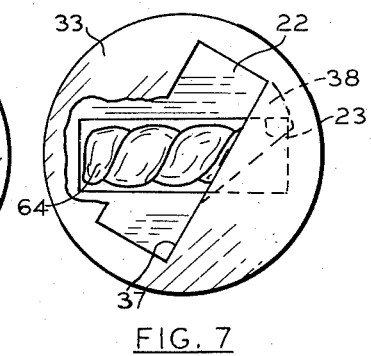

Figures 5, 6 and 7 are a series of three figures showing different phases in the operation of the machine: Figure 5 illustrates the feeding of two separate cylindrical strips of dough to the machine; Figure 6 shows these two strips of dough after the upper plate has rotated about 45° and an initial twist has been imparted to them; and Figure 7 shows the dough after it has been twisted and is ready to leave through the release door in the bottom plate.

Figure 8:
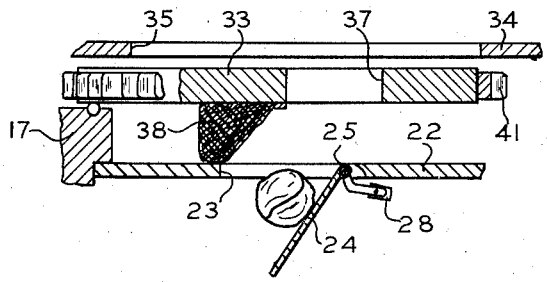

Figure 8 is a fragmentary vertical sectional view illustrating the twisted dough falling out of the machine through the release door in the bottom plate.

Figure 9 is a fragmentary side elevational view of another preferred embodiment of the invention showing the lower and upper parts of the tubular stand broken away so as to more clearly illustrate the arrangement of the mechanical elements therein; and Figure 10 is a top plan view looking down on the machine and illustrates three separate dough twisting mechanisms in the machine and planetary gears within a large stationary ring gear, for rotating the upper plates.

Figure 1:
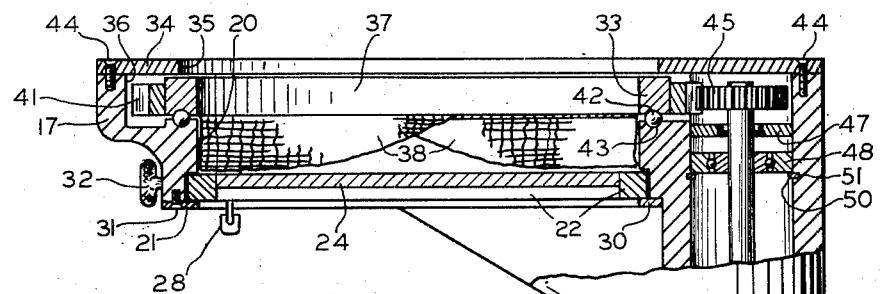
Figure 1 is a side elevational view of a preferred embodiment of the invention constructed in accordance with the specific teachings and illustrates the same with the lower part and the upper part of the tubular stand broken away so as to disclose the mechanical drive elements.
Figure 2:
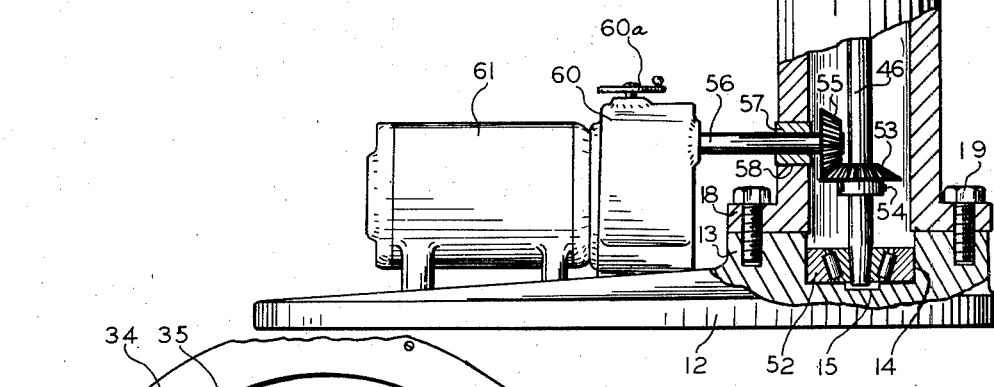
Figure 2 is an upper plan view looking down on the rotating plate with parts broken away to show the gears for rotating said plate.
Figure 2:
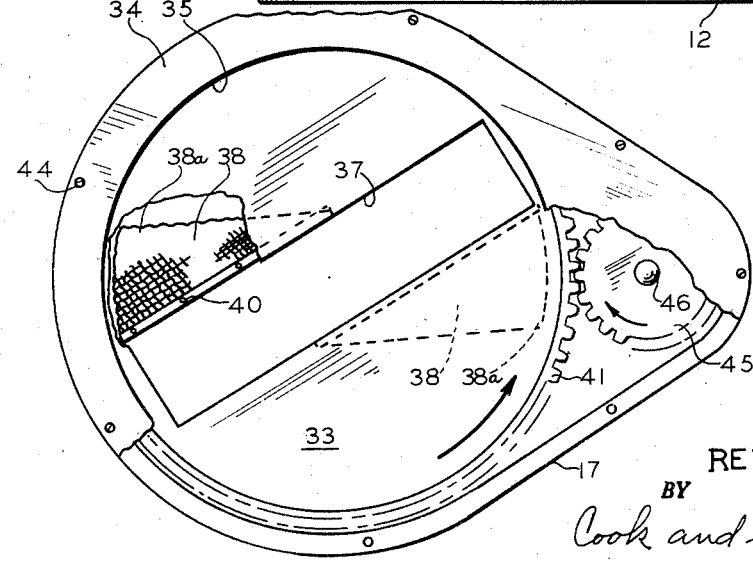
Figure 3:
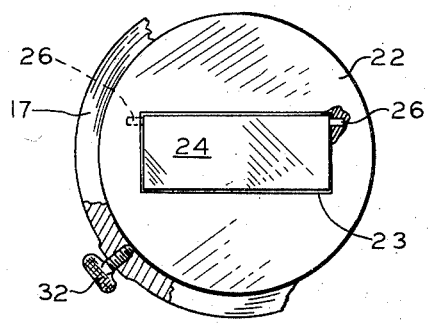
Figure 3 is an upper plan view looking down on the top of the lower plate and illustrates the release door therein.
Figure 4:
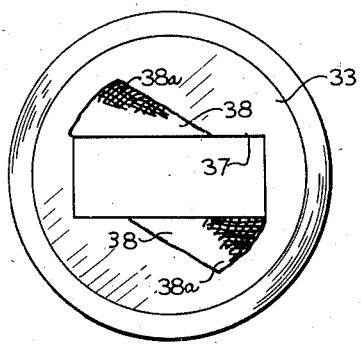
Figure 4 is an underneath plan view looking up at the bottom of the top plate and shows the inlet opening for receiving strips of dough and also the means for assuring the imparting of a twisting and rolling motion to the strips of dough on the lower plate.

Turning now to Figures 1 and 2, it is seen that the invention is embodied in a dough twisting machine indicated generally at 11. This machine has a base 12 which on one side rises upwardly into a circular stand 13. The stand 13 is drilled to form cylindrical recess 14, and the recess 14 is further cylindrically recessed at 15. Supported on the base and the stand is a circular tubular pedestal 16 which rises upwardly and at the uppermost part flanges outwardly along one side into, in a plan view, what appears to be a tear drop configuration 17 extending horizontally directly above the base. The base of the pedestal flanges outwardly into circumscribing flange 18. Bolts 19 project through this flange and into tapped openings in the stand 13. These bolts are spaced in a circular manner around the stand and the flange. This tear-drop configuration supplies the framework for the essential elements of the dough twisting mechanism.

The supporting frame 17 has a circular opening 20 to provide a cylindrical chamber for the dough. The lower part of the housing is of a larger diameter than the main portion 20 so as to provide cylindrical section 21. In this section there is positioned a stationary circular plate 22 which is rotatable only for adjustment purposes. This plate has a rectangular diametral opening 23 therein for the gravity discharge of a twisted dough product. Pivotally mounted in the rectangular opening 23 is a release door 24. This release door is hinged along the side of the opening 23 by means of pivot pins 25 which project into drilled openings 26 in the plate 22. Attached to the bottom side of door 24 is a counter-weight 28 arranged in such position that the door, without any external weight upon it, is normally held in a closed position in the opening 23. However, when external weight, such as twisted dough is upon it, the door swings open so as to allow the dough to fall therethrough.

The plate 22 is supported for rotative adjustment by a ring 30 which is fastened to the lower part of the support stand 17 by means of screws 31. Plate 22 is secured in adjusted position by a setscrew 32. The setscrew can be loosened, the plate 22 rotated to a desired orientation, and then the setscrew tightened to firmly clamp the plate.

In the upper part of the plate support 17 and above the cylindrical chamber 20 is an enlarged circular housing portion for a rotatable plate 33. This housing comprises part of the support 17 and an upper closure member 34. Said closure member, in top plan view, is also of a substantially tear-drop configuration to match the configuration of the plate support. However, the central portion of this closure member is removed to provide a circular opening 35. This closure member 34 in conjunction with the support frame 17 defines a housing 36 around the inside edge of the support 17 for receiving the rotatable plate 33. The upper portion of the support frame 17 is spaced outwardly from plate 33 to receive drive means to be described later.

The plate 33, like the plate 22, has a diametral rectangular opening 37. On each trailing side of this opening for approximately two-thirds the length thereof and extending to the end is a triangular depending flexible friction member 38. That portion of each friction member near the periphery of the plate 33 depends downwardly so that its lower corner 38a drags on the bottom plate 22. The friction members are attached to the plate 33 along the trailing sides of the opening 37 by means of screws 40. These friction members may be of solid material such as cloth or rubber or may be of a flexible wire mesh.

Surrounding the plate 33 is an external ring gear 41. This ring gear may be made integral with the plate 33 by sweating or shrinking it thereon or it may be made detachable to facilitate removal of the plate for cleaning. On an upper face of a portion of the housing 36 and underneath the plate 33 are ball bearings 42 contained in a recess 43. These bearings are arranged in a circle under an edge portion of plate 33 to support the plate as it rotates. The closure member 34 is secured on the plate support 17 by means of screws 44 to hold the parts just described in assembled relation.

The gear 41 meshes with drive gear 45 on the end of vertical drive shaft 46. This shaft extends from near the upper end of the tubular pedestal to the small cylindrical recess 15 in the base. Near the gear 45 and encircling the shaft is a dust seal 47. A ball bearing 48 is positioned inside of the tubular pedestal by means of a snap ring 50 in internal circular recess 51 in the pedestal. The ball bearing is supported by this snap ring 50 and positions the upper end of the shaft 46. The lower end of the shaft 46 is supported in a roller thrust bearing 52 in cylindrical recess 14 in the base 12. Near the lower end of the shaft 46 is a bevel gear 53 secured on the shaft by means of setscrew 54.

The bevel gear 53 is driven by bevel gear 55 on the end of drive shaft 56. This drive shaft is positioned by means of a bearing insert 57 in an aperture 58 in the wall of the tubular pedestal 16. The drive shaft 56 is part of a gear reduction box 60 which is driven by a motor 61. Both the motor 61 and the gear reduction box are mounted on the base 12 of the dough twisting machine. The speed of shaft 56 may be adjusted by hand wheel 60a which varies the drive ratio from the motor.

Turning now to the operation of this dough twisting machine, see Figure 5, it is seen that two roughly cylindrical strips of dough 62 and 63 are fed into the opening 37 in the rotatable plate 33 while the opening 37 is substantially at right angles to the opening 23 in the lower plate. These two strips of dough are dropped onto the lower plate 22 in parallel, side by side positions. The lower plate is in a fixed position and the upper plate 33 is rotating in a counter-clockwise direction, the vertical distance between the upper and lower plates being greater than the thickness of the dough strips. One of the flexible members 38 drags over and frictionally engages one end of strip 62, causing this end of strip 62 to roll and climb on top of the corresponding end of strip 63. At the same time the other flexible member 38 similarly rolls the opposite end of strip 63 on top of strip 62.

When a portion of one strip of dough has rolled on top of the other strip, the combined thickness is slightly greater than the distance between the two plates whereby the plates thereafter maintain good frictional engagement with the dough for further twisting. The working surfaces of the plates may be roughened or covered with a suitable friction material if desired, such as wire mesh, fabric or rough sponge rubber, to maintain the rolling and twisting action and prevent slipping.

Since the opposite ends of the strips are simultaneously twisted in opposite directions, a small amount of rotation of the upper plate quickly twists the two strips around each other, see Figure 6. Upon the continued rotation of the plate 33 the dough strips are further rolled and twisted between the two plates to form the twisted dough product 64.

Finally, the twisted dough 64 is rolled over opening 23 in the lower plate, see Figure 7, and onto the door 24. The door opens under the weight of the dough and the dough falls through the opening 23, see Figure 8, and onto a conveying means for removing it from the machine. As is seen in Figures 5, 6 and 7, from the time the two strips of dough are fed through the opening 37 in the upper plate at right angles to discharge opening 23 until the time the twisted dough falls through the opening 23 in the lower plate 22, the upper plate rotates through an angle of approximately 160°. After 20° more rotation the upper plate is in position to receive another pair of dough strips to be twisted. Therefore, assuming a 90° rotation of the dough strips about the vertical axis, for each complete revolution of the upper plate there may be prepared, in succession, two twisted dough products.

The orientation of the feed and delivery positions may be changed by loosening clamp screw 32 and appropriately turning the lower plate, and, with a given feed position of the upper plate, the amount of twist may be varied by adjusting the lower plate. The mid portions of the dough strips are maintained on the axis of rotation free of pressure from both plates and free to yield to the twisting of the end portions without tearing of the dough.

Another preferred embodiment of this invention is depicted in Figures 9 and 10 wherein three twisted dough pieces are in process at the same time. This embodiment comprises a base 65 which, in the central portion, projects upwardly into a circular rise or stand 66. This circular rise is drilled to have a large cylindrical recess 67 and at the lower part of this recess is a small cylindrical recess 68. Positioned on the rise 66 of the base is a tubular pedestal 70 having a lower circumscribing flange 71. Screws 72 project through the circumscribing flange 71 and into the rise 66 so as to integrally connect the tubular stand 70 with the base 65. The upper portion of the tubular stand flares outwardly into a circular frame member 73. This circular frame member also projects upwardly into a circumscribing circular flange, and near the inward edge thereof is an internal ring gear 74. This ring gear may be sweated on or welded to the frame 73.

In the tubular pedestal is a shaft 75 which projects above the uppermost part of the flange 79. The lower end of this shaft is supported in a roller bearing 76 in the recess 67 and may project slightly into the smaller recess 68. Above the roller bearing 76, and on the shaft 75, is a bevel gear 77 secured by a setscrew 78. The drive for this bevel gear is gear 80 on the end of shaft 81. Shaft 81 projects through the wall of the tubular pedestal 70 and is positioned in a bearing insert 82 in cylindrical opening 83 in said wall. The shaft 81 is connected with gear reduction box 84 which is driven by motor 85. Both the gear reduction box and the motor are mounted on the base 65. The speed of shaft 81 may be adjusted by hand wheel 84a which is arranged to vary the reduction ratio.

The upper end of the shaft is positioned in the tubular housing by means of ball bearing 86 which is supported on a split ring 87 in a circular recess 88 in the inside wall of the housing. Above the roller bearing 86 and at substantially the top of the housing is a dust seal 90. Above the dust seal and outside of the housing is an external split ring 91 in circular groove 92 on the shaft. Mounted on this shaft is a lower rotatable frame member 93 resting on the split ring 91. A spacer 94 is positioned above the frame 93 and surrounds the shaft to support an upper rotatable frame member 95. A washer 96 bears on the frame member 95 and the parts just described are clamped against split ring 91 by a nut 97 on the threaded end 98 of the shaft. The frame members 93 and 95 are suitably keyed to shaft 75 and carry the dough twisting mechanisms which are substantially similar in operation to the previously described mechanism. There are three dough twisting mechanisms in this embodiment and only one of these units will be described in detail because all are the same and are spaced on 120° centers in the frames 93 and 95.

The frame 93 has three openings 100 for receiving elements of the dough twisting mechanisms. The lower part 101 of each opening is recessed more than the opening 100 so as to have a shoulder 102 in this recessed portion to receive an adjustable circular plate 103. This plate has a rectangular diametral discharge opening 104 therein to allow the twisted dough to fall out of the mechanism through a door 105. This door is substantially like the door 24 previously described. A depending counterweight 105a maintains the door in a closed position with respect to the opening 104 in the absence of external weight. The plate 103 is supported and maintained in position by closure ring 106 which is attached to the frame 93 by screws 107 in tapped openings. Although the plate 103 does not rotate relative to frame 93 in the operation of the machine, it is possible to manually rotate the same. A setscrew 108 at the side of the frame holds the plate in adjusted rotative position in frame 93.

Resting on the upper side of the frame 93 directly above each stationary plate 103 is a rotating plate 110. This rotating plate is of a somewhat larger diameter than the cylindrical opening 100 and is supported in elevated position on frame 93 by a depending peripheral flange 111. The plate 110 has a diametral rectangular inlet opening 112. Depending from this rectangular opening along each trailing side and about two-thirds the length thereof is a triangular flexible friction member 113. These friction or drag members are similar to the previously described friction members 38 on the machine having only a single dough twisting mechanism. Near each end of the rectangular opening a corner 113a drags on the lower plate, while near the central portion of the rectangular opening the lower edge of the member 113 is nearer the upper plate than the lower plate.

Surrounding the peripheral flange 111 is an external ring gear 114 meshing with the stationary ring gear 74. The plate 110 and the ring gear 114 are keyed together by three lugs 116 on the plate which fit in recesses in the ring gear to facilitate removal of the plate for cleaning. Both the upper plate 110 and ring gear 114 rest on ball bearings 115 in circular grooves on the upper face of the frame 93 underneath the flange 111 and ring gear. The upper frame member 95 forms a cover plate covering the teeth on the gears 74 and 114 and also that portion of the rotating frame 93 not covered by the three circular plates 110. The ring gears 114 have upwardly projecting rim portions 114a rotatable in circular openings in frame 95 to hold these gears and plates 110 in position on their bearings 115.

Turning now to the operation of this dough mixing machine, it is seen that it functions on the principle of planetary gears. In Figure 10 it is seen that the frame members 93 and 95 form a planet carrier which rotates in a counter-clockwise direction. Because the ring gear 74 is stationary, the ring gears 114 and, therefore, the plates 110 rotate as planet gears in a clockwise direction. Bottom plates 103 are fixed in the planet carrier.

As in the previously described single unit machine, two strips of dough are fed into the rectangular inlet opening 112 in the upper plate in parallel, side by side relation, the strips being of less thickness than the distance between plates 103 and 110. The rotation of the upper plate causes the friction members 113 to roll and twist the two pieces of dough over each other, the combined thickness of the two strips of dough when one crosses over the other being slightly greater than the distance between plates 103 and 110. When the two pieces of dough have been formed into twisted dough and come into a position resting on the door 105, they then fall through the opening 104 in the lower plate 103.

From the above description of my machines it is readily realized that there is no objectionable compression or squeezing of the dough between the two plates. This is possible because of the depending friction members from the upper plate for starting a rolling and twisting action between plates which are spaced farther apart than the thickness of the individual dough strips. In machines used in the prior art the two plates or equivalent have been spaced closely together so as to themselves frictionally engage and start twisting of the dough and thereby there has been inherent in the prior art machines objectionable squeezing and compressing of the dough. Also in the prior art machines the dough has been worked excessively through an excessively long path of travel, whereas in the present machines the desired twist is obtained with very little rolling.

By means of the setscrew in connection with the lower plate it is possible to manually rotate this plate and thereby adjust the position of the egress opening with reference to the ingress opening in the upper plate. This makes it possible to vary the degree of twist imparted to the dough and also to change the positions of both openings for convenience in feeding and removal of the twisted products by conveyor belts and the like. Although not comprising part of this invention, it is to be realized that there may be employed with my machines automatic dough feeding devices and also automatic devices for removing the twisted dough from the machine.

As shown in Figures 9 and 10, the diameter of gear 74 is two and one-half times the diameter of gears 114. Thus each top plate 110 makes two and one-half revolutions with respect to its companion bottom plate 103 in each revolution of the planet carrier frame 93, 95, whereby each top plate will be in a possible feeding position five times and the dough products will come to discharge positions five times in each revolution of the planet carrier frame, assuming 90° rotation of the dough as before. This makes it possible to produce fifteen dough products per revolution of the planet frame if all possible loading positions are utilized. With the above mentioned gear ratio the feeding and discharge positions of the plates will occur at the same stations around the pedestal in each revolution of the planet carrier frame for convenient dough feeding and product removal by belt conveyors or the like at said stations.

While I have shown and described specific constructions of machines for twisting dough, these are by way of illustration only and I consider as my own all such modifications in structure as fairly fall within the scope of the appended claims.

Having now described my invention and in what manner the same way be used, what I claim as new and desire to protect by Letters Patent is:

1. A dough twisting machine comprising a pair of vertically spaced superposed horizontal plates, means for rotating one of said plates relative to the other about a vertical axis through the center of the rotatable plate, an elongated feed opening in the upper plate disposed in a diametral position in relation to the rotatable plate whereby two parallel strips of dough deposited on the lower plate through said feed opening will have their ends rolled in opposite directions and twisted together by the relative rotation of said plates, and an elongated discharge opening in the lower plate disposed in a diametral position in relation to the rotatable plate.

2. A dough twisting machine comprising a pair of vertically spaced superposed horizontal plates, means for rotating one of said plates relative to the other about a vertical axis through the center of the rotatable plate, and elongated feed opening in the upper plate disposed in a diametral position in relation to the rotatable plate, flexible friction drag means depending from the trailing side portions of said feed opening to start the rolling and twisting of dough strips on said lower plate which are of less thickness individually than the distance between the plates, and an elongated discharge opening in the lower plate disposed in a diametral position in relation to the rotatable plate.

3. A dough twisting machine comprising a frame holding an upper plate and a lower plate in vertically spaced relation with each other, means to rotate one of the plates relative to the other plate, a diametral ingress opening in the upper plate to allow dough to enter between the two plates, a diametral egress opening in the lower plate to allow twisted dough to exit from between the two plates, means to adjust the rotative position of the other plate, and flexible friction means connected with one of said plates to start the twisting of the dough in said machine.

4. A dough twisting machine comprising a frame holding an upper plate and a lower plate in vertically spaced relation, an ingress opening in the upper plate to allow dough to enter between the two plates, an egress opening in the lower plate to allow the dough to exit from between the two plates, means to rotate said upper plate relative to said lower plate, means to vary the rotative position of the lower plate, and flexible friction drag means depending from said upper plate to contact the dough on the lower plate so as to assure twisting of the same.

5. A dough twisting machine comprising a frame holding an upper plate and a lower plate in vertically spaced relation, an ingress opening in the upper plate to allow dough to enter between the two plates, an egress opening in the lower plate to allow the dough to exit between the two plates, means to adjust the position of the lower plate in rotation, means to rotate said upper plate relative to said lower plate, flexible friction drag means depending from said upper plate to contact the dough on the lower plate so as to assure twisting of the same, a release door on the lower plate, and said door co-acting with the egress opening so as to close the egress opening except when dough rests on the release door.

6. A dough twisting machine comprising a pair of vertically spaced superposed horizontal plates, a ring gear on the periphery of one of said plates, means for rotating said ring gear and plate, a diametral feed opening in the upper plate, and a diametral discharge opening in the lower plate.

7. A dough twisting machine comprising a pair of vertically spaced superposed horizontal plates, peripheral drive means on one of said plates for rotating the plate, a diametral feed opening in the upper plate, a diametral discharge opening in the lower plate, and means extending between said plates to engage and start the rolling and twisting of dough strips which are individually of less thickness than the distance between said plates.

8. A dough twisting machine comprising a multiplicity of dough twisting mechanisms mounted on a rotating frame, each mechanism comprising an upper plate and a lower plate in vertically spaced relation, an ingress opening in the upper plate to allow dough to enter between said plates, an egress opening in the lower plate to allow dough to exit from between said plates, means operable by rotation of said frame to rotate one of said plates of each mechanism relative to the other plate, and means connected with one of said plates of each mechanism and projecting between the plates to assure twisting the dough.

9. A dough twisting machine comprising a turntable frame rotatable about a vertical axis through its center, a plurality of pairs of vertically spaced upper and lower superposed horizontal plates in said frame, one set of said plates on a common level being rotated as planet gears by rotation of said frame, an elongated feed opening in each upper plate disposed in a diametral position in relation to the rotatable plate of the pair, and an elongated discharge opening in each lower plate disposed in a diametral position in relation to the rotatable plate of the pair.

10. A dough twisting machine comprising a multiplicity of dough twisting mechanisms mounted on a turntable frame, each mechanism comprising an upper plate and a lower plate in a vertically spaced relation, an ingress opening in the upper plate to allow the dough to enter between said plates, an egress opening to allow said dough to exit between said plates, means to adjust the positions of the lower plates individually in rotation, means operable by said turntable frame to rotate the upper plates relative to the lower plates, and means depending from the upper plates for assuring the imparting of twist to the dough.

11. A dough twisting machine comprising a stationary frame and a rotatable frame, said stationary frame housing an internal gear, said rotatable frame housing a multiplicity of dough twisting mechanisms, each mechanism comprising a lower plate and an upper plate in vertically spaced relation, said upper plate having an ingress opening for dough to enter between said plates, said lower plate having an egress opening for allowing the dough to leave from between said plates, individual means to adjust the rotative position of each lower plate, flexible friction means depending from said upper plate to insure the imparting of twist to the dough, and said upper plates having gears engaged with said internal gear so that upon rotation of the rotatable frame the upper plates rotate in a planetary motion within said stationary frame.

References Cited in the file of this patent

UNITED STATES PATENTS

| | | |
|---|---|---|
| 1,792,672 | Zaiss | Feb. 17, 1931 |
| 2,259,476 | MacManus | Oct. 21, 1941 |